United States Patent
Kurek et al.

(10) Patent No.: US 6,425,624 B1
(45) Date of Patent: *Jul. 30, 2002

(54) SECURING SYSTEM FOR INTEGRALLY SHAPED BUMPER

(75) Inventors: Gerhard Kurek, Weiβenburg; Dietmar Preissler, Hagenbuch, both of (DE)

(73) Assignee: Dynamit Nobel Kunststoff GmbH, Troisdorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,045

(22) PCT Filed: Feb. 18, 1998

(86) PCT No.: PCT/EP98/00914

§ 371 (c)(1),
(2), (4) Date: Dec. 13, 1999

(87) PCT Pub. No.: WO98/38066

PCT Pub. Date: Sep. 3, 1998

(30) Foreign Application Priority Data

Feb. 28, 1997 (DE) ............................ 197 08 118

(51) Int. Cl.⁷ .......................... B60R 19/04; B60R 19/42
(52) U.S. Cl. .................. 296/155; 296/126; 296/154
(58) Field of Search .............................. 293/154, 126, 293/155

(56) References Cited

U.S. PATENT DOCUMENTS

| | | | | |
|---|---|---|---|---|
| 4,095,831 A | * | 6/1978 | Hagiwara et al. | 293/126 |
| 4,274,667 A | * | 6/1981 | Dietmar | 293/155 |
| 4,695,084 A | | 9/1987 | Hlavach | 96/126 |
| 4,753,467 A | * | 6/1988 | Decaluwe et al. | 293/126 |
| 4,875,728 A | * | 10/1989 | Copp et al. | 293/126 |
| 4,877,279 A | * | 10/1989 | Logan | 293/155 |
| 5,022,692 A | * | 6/1991 | Horansky et al. | 293/126 |
| 5,092,643 A | * | 3/1992 | Okamoto et al. | 293/155 |
| 5,242,200 A | * | 9/1993 | Kamm et al. | 293/126 |
| 5,915,767 A | * | 6/1999 | Hosoda et al. | 293/126 |

FOREIGN PATENT DOCUMENTS

FR  2634703  2/1990

* cited by examiner

Primary Examiner—Joseph D. Pape
Assistant Examiner—Hilary Gutman
(74) Attorney, Agent, or Firm—Antonelli, Terry, Stout & Kraus, LLP

(57) ABSTRACT

A front or rear bumper (1) for a motor vehicle has a main part which is disposed transversely to the vehicle and side parts which extend approximately in the longitudinal direction of the vehicle. The bumper (1) so secured at points on the vehicle. To prevent the side parts of the bumper (1) from permanently deforming the sheet metal bodywork or mudguard (5) in the event of an accident, the system for securing the side parts, in particular at their ends, is designed so as to be detachable.

3 Claims, 3 Drawing Sheets

SECURING SYSTEM FOR INTEGRALLY SHAPED BUMPER

BACKGROUND OF THE INVENTION

The invention relates to a securing system for a shape-integrated bumper.

Relatively new bumpers comprise a main portion which is arranged transversely with respect to the motor vehicle and has side portions which extend substantially in the longitudinal direction of the vehicle. The bumper can be constructed in one piece or in several pieces and is secured at points on the vehicle. The main portion is connected to a support of the vehicle and the side portions are preferably connected to the mudguard.

Current bumper systems are more and more becoming part of the bodywork. However, they still have to fulfill the function of a bumper. The aim in this respect is that the bodywork should remain undamaged in the event of small crashes. The new bumper systems are integrated directly into the chassis, i.e. there is no longer a lateral projection in this respect. In the case of a fixed connection, this would mean that the sheet metal bodywork is permanently deformed. Consequently, considerable repair costs result.

BRIEF SUMMARY OF THE INVENTION

The underlying object of the invention is to develop a front or rear bumper in such a way that in the event of an accident, the side portions of the bumper do not permanently deform the sheet metal bodywork or the mudguard.

This object is achieved in accordance with the invention as a result of the fact that the securing of the side portions, in particular at the ends thereof, is designed so as to be detachable.

When the side portions are screwed to the vehicle or mudguard, the screwed connection is advantageously arranged on an incline and under the action of a force can be displaced into the open position. The term open position nears the position in which the side portions are no longer integrated in the chassis but protrude outwards. As a result of this, they cannot deform the chassis in the event of an accident. In this connection, the direction of movement is generally outward along the incline.

In a preferred embodiment, the securing screws with which the side portions are secured to the chassis or mudguard have arranged on their head a sliding plate, which can be displaced on the incline. In this connection, the sliding plate is guided on the incline in a type of groove.

Sensibly, the incline is arranged on the bumper. The screw with the sliding plate therefore penetrates the chassis or the mudguard and is secured with a nut.

BRIEF DESCRIPTION OF THE DRAWINGS

Further features emerge from the figures, which are described in the following.

DETAILED DESCRIPTION OF THE INVENTION

Figure 1:
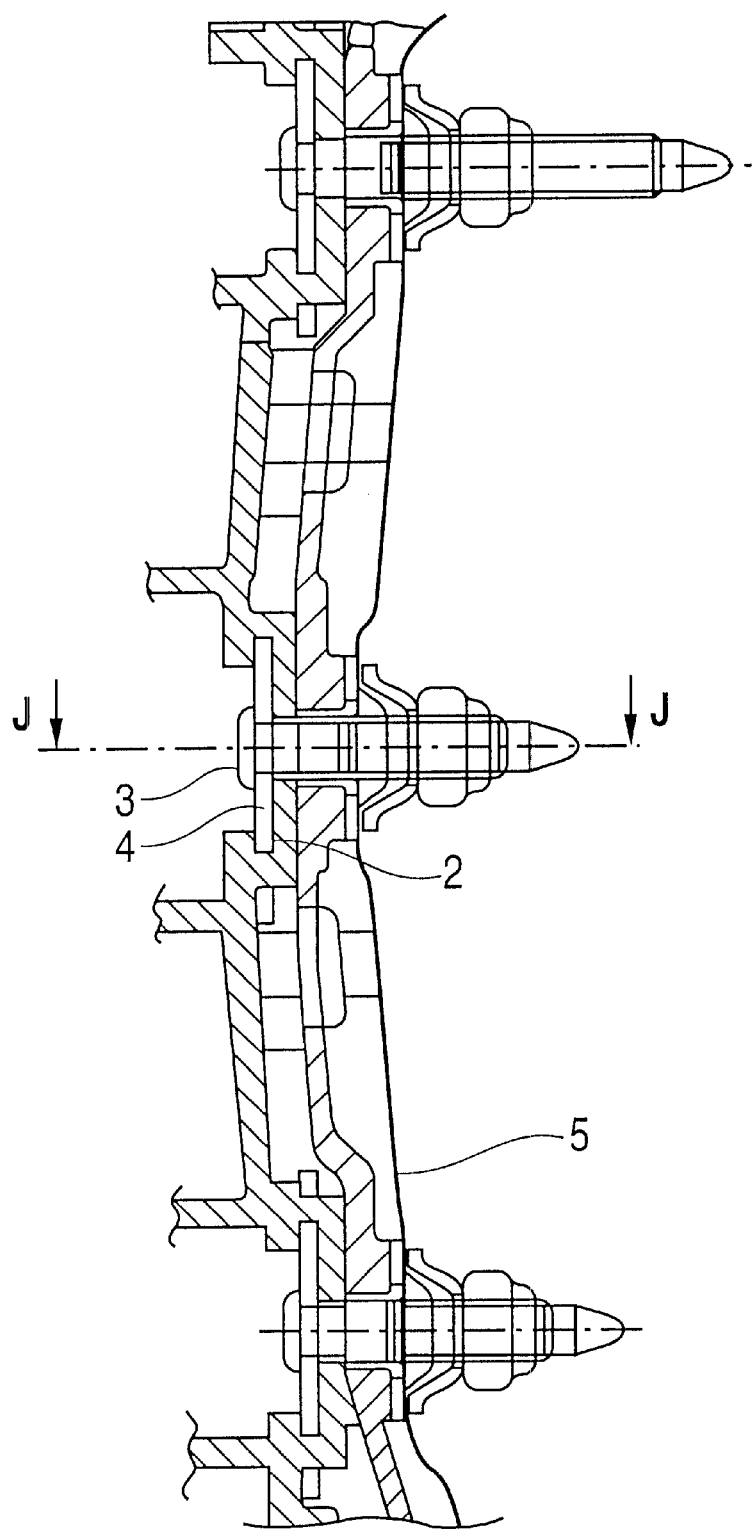
FIG. 1 shows in section the securing of a bumper to a mudguard in accordance with the invention.
Figure 2:
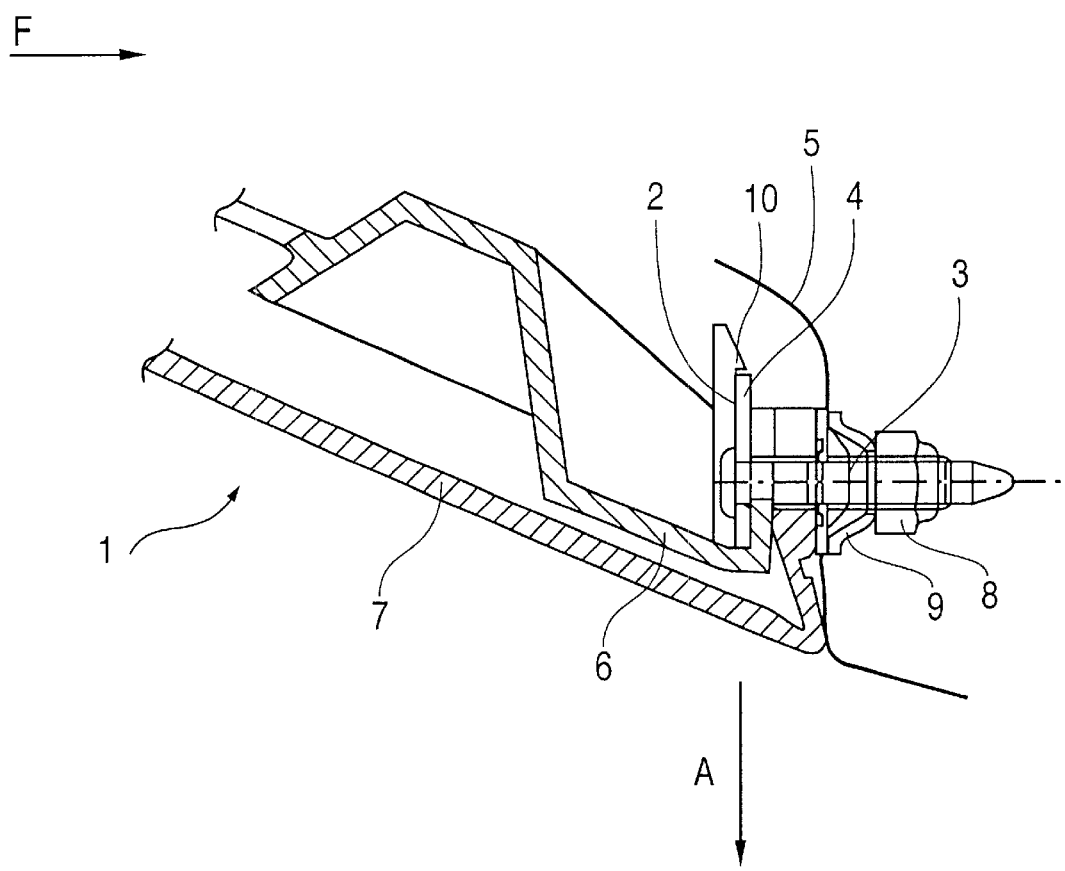
FIG. 2 shows a section according to line J—J of FIG. 1.

FIG. 1 shows in section the securing in accordance with the invention of a bumper 1 to a mudguard 5. The bumper 1 comprises a main portion which is arranged transversely with respect to the vehicle and has side portions which extend to the left and to the right substantially in the longitudinal direction of the vehicle. The end of a side portion, which is secured by way of a screwed connection to the mudguard 5, is shown. FIG. 2 shows a section according to the line J—J of FIG. 1.

Figure 3:
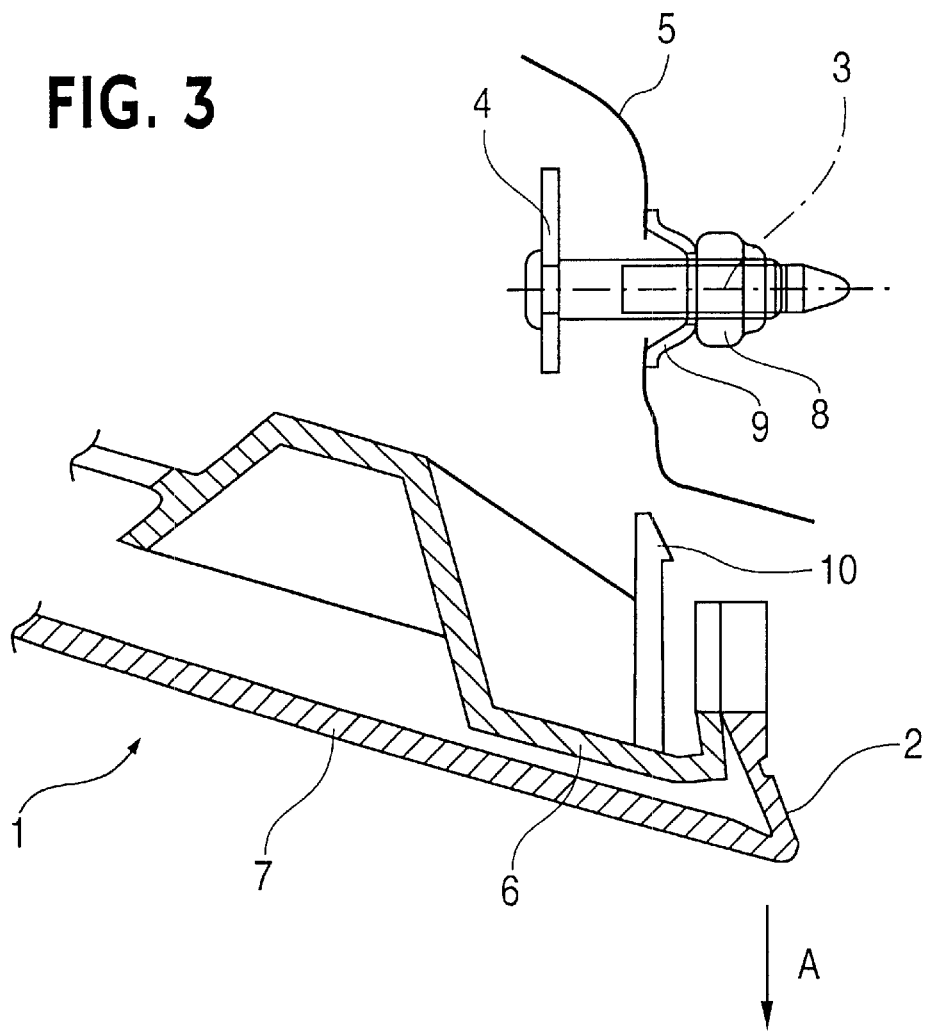
FIG. 3 shows a section similar to that of FIG. 2, but with the side portion of the bumper in the open position.

The end of the side portions consists of a closing portion 6 and a cover 7. The cover 7 is the portion which is visible from the outside. Arranged in the closing portion 6 is an incline 2, on which the head of a securing screw 3 rests. The head of the securing screw 3 is constructed as a sliding plate 4 and is guided on the incline 2 in a guide. The securing screw 3 penetrates the mudguard 5 and is fixed by way of a nut 8 and a spacer 9. In the closed position (i.e., before an accident see FIGS. 1 and 2), the sliding plate 4 is held on the incline 2 or in the associated guide by way of a clip 10. In the event of an accident, the force F causes the closing portion 6 with the incline 2 to slide over the sliding plate 4 into the open position shown in FIG. 3. This direction of movement is indicated in FIGS. 2 and 3 by the arrow A. The clip 10 is thereby pushed away or broken off. All portions of the bumper 1 consist of plastics. Only the securing screw 3 with the sliding plate 4 is made of metal.

After an accident where the clip is merely pushed away rather than broken off, the bumper can be put back into its original position by slackening the securing screw and refastening.

What is claimed is:

1. A bumper for a motor vehicle, comprising:

a side portion shaped to extend substantially in a longitudinal direction of the motor vehicle, the side portion having a closing portion to be secured to a mudguard of the motor vehicle and a cover visible from outside the motor vehicle, an incline portion provided on the closing portion, the incline portion having a sliding surface inclined from the longitudinal direction of the vehicle;

a screw having a head comprising a sliding plate, the sliding surface of the incline portion being displaceably guided on the sliding plate of the screw between a closed position and an open position, the screw being securable to the mudguard of the motor vehicle; and a clip on the incline portion for retaining the sliding surface of the incline portion in the closed position;

whereby in the closed position, the sliding plate of the screw is held on the sliding surface of the incline portion, and, in the event a force is applied to the bumper, the sliding surface of the incline portion slides over the sliding plate of the screw into the open position in which the side portion protrudes outwardly from a side of the mudguard of the motor vehicle.

2. The bumper according to claim 1, wherein the screw having the head comprising the sliding plate is made of metal and the side portion of the bumper, including the incline portion, is made of plastic.

3. The bumper according to claim 2, wherein the screw is securable to the motor vehicle with a nut.

* * * * *